US012705820B2

(12) United States Patent
Ahn et al.

(10) Patent No.: US 12,705,820 B2
(45) Date of Patent: Aug. 11, 2026

(54) METHOD AND APPRATUS WITH NEURAL RENDERING BASED ON VIEW AUGMENTATION

(71) Applicant: SAMSUNG ELECTRONICS CO., LTD., Suwon-si (KR)

(72) Inventors: Young Chun Ahn, Suwon-si (KR); Nahyup Kang, Suwon-si (KR); Seokhwan Jang, Suwon-si (KR); Jiyeon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 268 days.

(21) Appl. No.: 18/332,273

(22) Filed: Jun. 9, 2023

(65) Prior Publication Data

US 2024/0135632 A1 Apr. 25, 2024

(30) Foreign Application Priority Data

Oct. 7, 2022 (KR) ........................ 10-2022-0128898
Dec. 19, 2022 (KR) ........................ 10-2022-0178564

(51) Int. Cl.
*G06T 15/08* (2011.01)
*G06T 3/18* (2024.01)
(Continued)

(52) U.S. Cl.
CPC ................ *G06T 15/08* (2013.01); *G06T 3/18* (2024.01); *G06T 7/194* (2017.01); *G06T 7/50* (2017.01);
(Continued)

(58) Field of Classification Search
CPC ................................ G06T 15/08; G06T 7/194
See application file for complete search history.

(56) References Cited

U.S. PATENT DOCUMENTS 11,164,394 B2 11/2021 Gausebeck
2021/0279952 A1 9/2021 Chen et al.
(Continued)

FOREIGN PATENT DOCUMENTS

KR 10-2395123 B1 5/2022

OTHER PUBLICATIONS (C. Xie, K. Park, R. Martin-Brualla, M. Brown "FiG-NeRF: Figure-Ground Neural Radiance Fields for 3D Object Category Modelling," arXiv:2104.08418 [cs.CV], published Apr. 2021, 12 pages) (Year: 2021).*

(Continued)

*Primary Examiner* — Xiao M Wu
*Assistant Examiner* — Ahmed Taha
(74) *Attorney, Agent, or Firm* — Sughrue Mion, PLLC

(57) ABSTRACT

A method and apparatus for neural rendering based on view augmentation are provided. A method of training a neural scene representation (NSR) model includes: receiving original training images of a target scene, the original training images respectively corresponding to base views of the target scene; generating augmented images of the target scene by warping the original training images, the augmented images respectively corresponding to new views of the target scene; performing background-foreground segmentation on the original training images and the augmented images to generate segmentation masks; and training a neural scene representation (NSR) model to be configured for volume rendering of the target scene by using the original training images, the augmented images, and the segmentation masks.

12 Claims, 9 Drawing Sheets

(51) Int. Cl.
*G06T 7/194* (2017.01)
*G06T 7/50* (2017.01)
*G06T 15/06* (2011.01)

(52) U.S. Cl.
CPC .... *G06T 15/06* (2013.01); *G06T 2207/20081* (2013.01); *G06T 2207/20084* (2013.01); *G06T 2207/30244* (2013.01)

(56) References Cited

U.S. PATENT DOCUMENTS

| | | | |
|---|---|---|---|
| 2022/0101047 A1 | 3/2022 | Puri et al. | |
| 2022/0130111 A1 | 4/2022 | Martin Brualla et al. | |
| 2022/0156886 A1 * | 5/2022 | Petrangeli | G06T 3/606 |

OTHER PUBLICATIONS

Kisantal et al (M. Kisantal, Z. Wojna, J. Murawski, J. Naruniec, K. Cho "Augmentation for small object detection" arXiv: 1902. 07296v1 [cs.CV], published Feb. 2019, 15 pages). (Year: 2019).*

(E. Guo, Z. Chen, Y. Zhou, D. Wu "Unsupervised Learning of Depth and Camera Pose with Feature Map Warping", published Jan. 30, 2021, 15 pages) (Year: 2021).*

(A. Gunawan, S. Rizky, H. Madjid "CISRNet: Compressed Image Super-Resolution Network" arXiv:2201.06045 [cs.CV], published Jan. 2022, 10 pages). (Year: 2022).*

(N. Sunderhauf , J, Abou-Chakara, D. Miller "Density-aware NeRF Ensembles: Quantifying Predictive Uncertainty in Neural Radiance Fields" arXiv:2209.08718 [cs.CV], published Sep. 19, 2022, 7 pages). (Year: 2022).*

Yu, Alex, et al., "Pixelnerf: Neural Radiance Fields from One or Few Images," Proceedings of the IEEE/CVF Conference on Computer Vision and Pattern Recognition, 2021, (p. 4578-4587).

Jain, Ajay, et al., "Putting Nerf on a Diet: Semantically Consistent Few-Shot View Synthesis," Proceedings of the IEEE/CVF International Conference on Computer Vision, 2021, (p. 5885-5894).

Mildenhall, Ben, et al., "Nerf: Representing Scenes as Neural Radiance Fields for View Synthesis," Communications of the ACM, 2021, (17 Pages in English).

Radford, Alec, et al., "Learning Transferable Visual Models from Natural Language Supervision," International conference on machine learning, 2021, (47 Pages in English).

Caron, Mathilde, et al., "Emerging Properties in Self-Supervised Vision Transformers," Proceedings of the IEEE/CVF international conference on computer vision, 2021, (p. 9650-9660).

Dosovitskiy, Alexey, et al., "An Image Is Worth 16x16 Words: Transformers for Image Recognition at Scale," arXiv:2010. 11929v2, Jun. 3, 2021, (22 Pages in English).

Kim, Mijeong, et al., "Infonerf: Ray Entropy Minimization for Few-Shot Neural Volume Rendering," Proceedings of the IEEE/CVF Conference on Computer Vision and Pattern Recognition, 2022, (p. 12912-12921).

Niemeyer, Michael, et al., "Regnerf: Regularizing Neural Radiance Fields for View Synthesis from Sparse Inputs," Proceedings of the IEEE/CVF Conference on Computer Vision and Pattern Recognition, 2022, (p. 5480-5490).

Deng, Kangle, et al., "Depth-Supervised Nerf: Fewer Views and Faster Training for Free," Proceedings of the IEEE/CVF Conference on Computer Vision and Pattern Recognition, 2022, (p. 12882-12891).

Xu, Dejia, et al., "Sinnerf: Training Neural Radiance Fields on Complex Scenes from a Single Image," Computer Vision-ECCV, Oct. 23, 2022, (18 Pages in English).

Ahn, Young Chun, et al., "Panerf: Pseudo-View Augmentation for Improved Neural Radiance Fields Based on Few-Shot Inputs," arXiv:2211.12758v1, Nov. 23, 2022, (10 Pages in English).

Zhang, Cha, et al., "A survey on image-based rendering-representation, sampling and compression." Signal Processing: Image Communication 19.1 (2004): 1-28.

Kundu, Abhijit, et al. "Panoptic Neural Fields: a Semantic Object-Aware Neural Scene Representation." Proceedings of the IEEE/CVF Conference on Computer Vision and Pattern Recognition. 2022, (11 pages).

Extended European search report issued on Apr. 10, 2024, in counterpart European Patent Application No. 23187904.0 (7 pages).

* cited by examiner $X' = \{X'_m | X'_m = (I'_m, P'_m)\}$

METHOD AND APPRATUS WITH NEURAL RENDERING BASED ON VIEW AUGMENTATION

CROSS-REFERENCE TO RELATED APPLICATIONS

This application claims the benefit under 35 USC § 119(a) of Korean Patent Application No. 10-2022-0128898, filed on Oct. 7, 2022, and Korean Patent Application No. 10-2022-0178564, filed on Dec. 19, 2022, in the Korean Intellectual Property Office, the entire disclosures of which are incorporated herein by reference for all purposes.

BACKGROUND

1. Field

The following description relates to a method and apparatus with neural rendering based on image augmentation.

2. Description of Related Art

Three-dimensional (3D) rendering is a field of computer graphics for rendering a 3D scene into a two-dimensional (2D) image. 3D rendering may be used in various application fields, such as 3D games, virtual reality, animation, movie effects, and the like. Neural rendering may involve converting a 3D scene into a 2D output image using a neural network. The neural network may be trained based on deep learning, and then perform an inference according to a purpose by mapping input data and output data in a nonlinear relationship with each other. The trained ability to generate such a mapping may be referred to as a learning ability of the neural network. A deep neural network may observe a real scene through training images of the real scene and thereby learn modeling and rendering of the scene.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of training a neural scene representation (NSR) model includes: receiving original training images of a target scene, the original training images respectively corresponding to base views of the target scene; generating augmented images of the target scene by warping the original training images, the augmented images respectively corresponding to new views of the target scene; performing background-foreground segmentation on the original training images and the augmented images to generate segmentation masks; and training a neural scene representation (NSR) model to be configured for volume rendering of the target scene by using the original training images, the augmented images, and the segmentation masks.

The generating of the augmented images may include: determining a transformation function for transforming a camera pose of a first of the base views of a first of the original training images into a camera pose of a first of the new views of a first of the augmented images; and generating the first augmented image by warping the first original training image using an intrinsic camera parameter of the first original training image, an original depth map corresponding to the first original training image, and the transformation function.

The training of the NSR model may include: performing primary training of the NSR model using the original training images, the augmented images, the segmentation masks, and a first loss function; and performing secondary training of the NSR model using the original training images and a second loss function.

The first loss function may be based on a pixel error between (i) an actual pixel value from the original training images and the augmented images and (ii) a pixel value estimated by the NSR model, and the second loss function is based on a pixel error between the original training images and a synthesized image estimated by the NSR model, semantic consistency between the original training images and the synthesized image, and uncertainty of transmittance based on a ray.

The performing of the primary training may include: selecting a first sample image from the original training images and the augmented images; determining a first query output of the NSR model according to a first query input defining a first ray; determining a target area to which the first ray belongs from among a foreground area of the first sample image and a background area of the first sample image, based on the segmentation masks; and determining a loss value of the first loss function based on an actual pixel value of a first pixel of the target area specified by the first ray and an estimated pixel value according to the first query input.

The determining of the target area may include: dividing the foreground area of the first sample image and the background area of the first sample image by applying a first of the segmentation masks corresponding to the first sample image to the first sample image; when the first ray indicates the foreground area of the first sample image, determining the foreground area of the first sample image to be the target area; and when the first ray indicates the background area of the first sample image, determining the background area of the first sample image to be the target area.

The performing of the secondary training may include: generating a first synthesized image according to a first ray set of a first of the original training images by using the NSR model; estimating first semantic characteristics of patches of the first original training image and second semantic characteristics of patches of the first synthesized image; determining semantic consistency between the first original training image and the first synthesized image based on a difference between the first semantic characteristics and the second semantic characteristics; and determining a loss value of the second loss function based on the determined semantic consistency.

The performing of the secondary training may include: based on products of volume densities and transmittances of sample points of rays of a first original training image among the original training images, determining weights of the sample points; and determining a loss value of the second loss function based on the weights of the rays.

The number of original training images may be limited to a predetermined number.

In one general aspect, an apparatus includes: one or more processors; and a memory storing instructions configured to cause the one or more processors to: receive original training images of a target scene, generate augmented images of the target scene by warping the original training images, determine foreground-background segmentation masks of the original training images and the augmented images by performing foreground-background segmentation on the original training images and the augmented images, and train a neural scene representation (NSR) model to be configured for volume rendering of the target scene by using the original training images, the augmented images, and the foreground-background segmentation masks.

The original training images may be respectively associated with base camera poses, the augmented training images may be respectively associated with new camera poses, and the training of the NSR model may also use the base camera poses and the new camera poses.

To generate the augmented images, the instructions may be further configured to cause the one or more processors to: determine a transformation function for transforming a base camera pose of a first original training image of the original training images into a new camera pose of a first augmented image of the augmented images, and generate the first augmented image by warping the first original training image using a camera intrinsic parameter of the first original training image, an original depth map corresponding to the first original training image, and the transformation function.

To train the NSR model, the instructions may be further configured to cause the one or more processors to: perform primary training of the NSR model using the original training images, the augmented images, the segmentation masks, and a first loss function, and perform secondary training of the NSR model using the original training images and a second loss function.

The first loss function may be based on a pixel error between an actual pixel value of the original training images and the augmented images and a pixel value estimated by the NSR model, and the second loss function may be based on a pixel error between the original training images and a synthesized image estimated by the NSR model, semantic consistency between the original training images and the synthesized image, and uncertainty of transmittance based on a ray.

To perform the primary training, the instructions may be further configured to cause the one or more processors to: select a first sample image from the original training images and the augmented images, determine a first query output of the NSR model according to a first query input indicating a first ray, determine a target area to which the first ray belongs among a foreground area of the first sample image and a background area of the first sample image, based on the foreground-background segmentation masks, and determine a loss value of the first loss function based on an actual pixel value of a first pixel of the target area specified by the first ray and an estimated pixel value according to the first query output.

To determine the target area, the instructions may be further configured to cause the one or more processors to: divide the foreground area of the first sample image and the background area of the first sample image by applying a first of the foreground-background segmentation masks corresponding to the first sample image to the first sample image, when the first ray indicates the foreground area of the first sample image, determine the foreground area of the first sample image to be the target area, and when the first ray indicates the background area of the first sample image, determine the background area of the first sample image to be the target area.

To perform the secondary training, the instructions may be further configured to cause the one or more processors to: generate a first synthesized image according to a first ray set of a first of the original training images by using the NSR model, estimate first semantic characteristics of multi-level patches of the first original training image and second semantic characteristics of multi-level patches of the first synthesized image, determine semantic consistency between the first original training image and the first synthesized image based on a difference between the first semantic characteristics and the second semantic characteristics, and determine a loss value of the second loss function based on the determined semantic consistency.

In another general aspect, an electronic device includes: a camera generating original training images of respective original camera poses of a target scene; and one or more processors; a memory storing instructions configured to cause the one or more processors to: generate augmented images of respective augmentation-image camera poses for the target scene by warping the original training images, determine segmentation masks for dividing areas of the original training images and the augmented images by performing segmentation on the original training images and the augmented images, and train a neural scene representation (NSR) model used for volume rendering for the target scene by using the original training images and their respective original camera poses, the augmented images and their respective augmentation-image camera poses, and the segmentation masks.

To generate the augmented images, the instructions may be further configured to cause the one or more processors to: determine a transformation function for transform a first original camera pose of a first of the original training images into a first of the augmentation-image camera poses of a first of the augmented images, and generate the first augmented image by warping the first original training image using the transformation function.

To train the NSR model, the instructions may be further configured to cause the one or more processors to: perform primary training of the NSR model using the original training images, the augmented images, the segmentation masks, and a first loss function, and perform secondary training of the NSR model using the original training images and a second loss function, wherein the first loss function is based on a pixel error between an actual pixel value of the original training images and the augmented images and a pixel value estimated by the NSR model, and wherein the second loss function is based on a pixel error between the original training images and a synthesized image estimated by the NSR model, semantic consistency between the original training images and the synthesized image, and uncertainty of transmittance based on a ray.

Other features and aspects will be apparent from the following detailed description, the drawings, and the claims.

Figure 1:
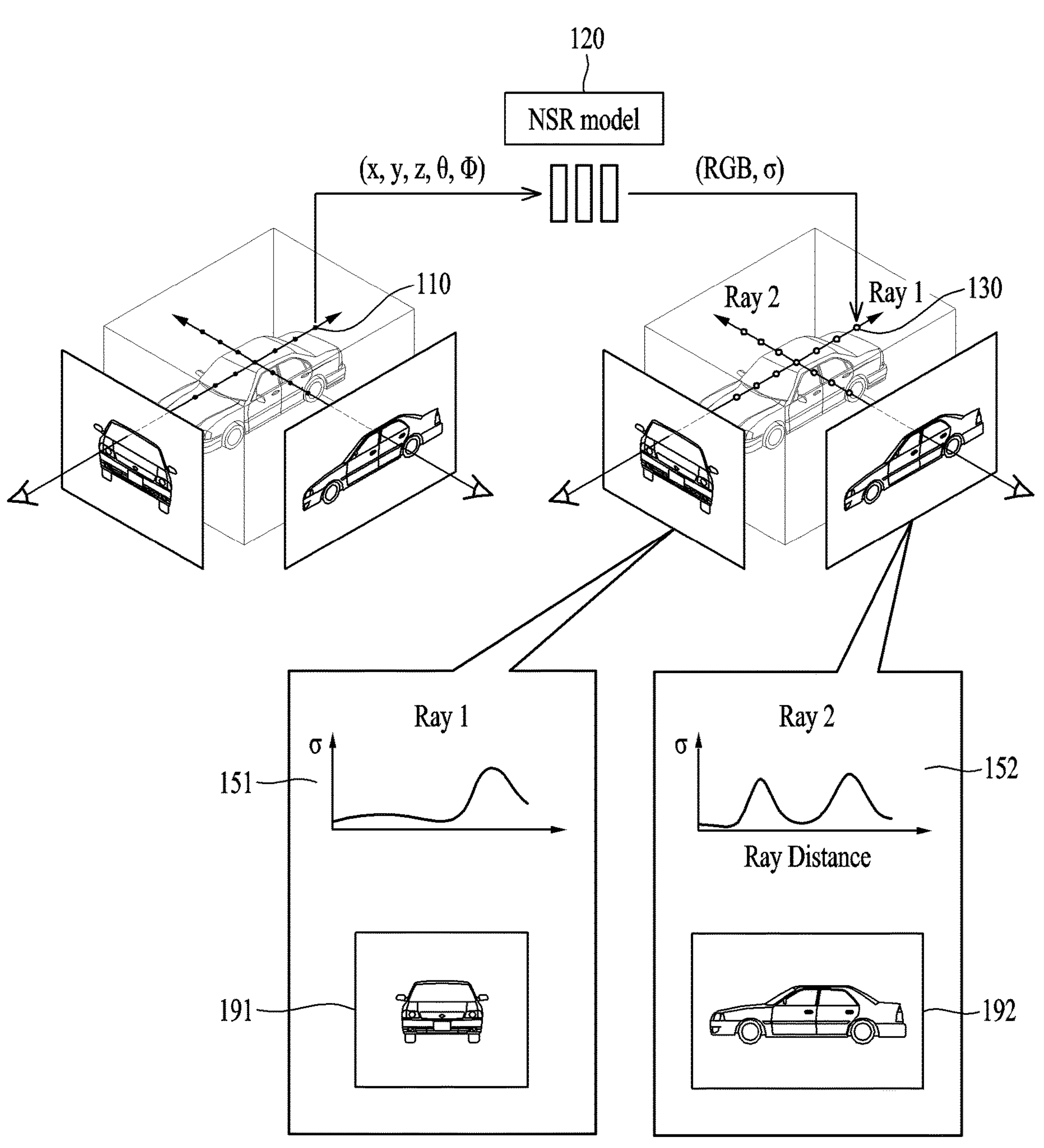
FIG. 1 illustrates an example neural scene representation, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of neural scene representation, according to one or more embodiments.

According to an example, a scene of a three-dimensional (3D) space may be represented by neural scene representation (NSR) model using points in the 3D space. FIG. 1 shows an example of deriving, from a query input 110 specifying a point and direction in a 3D space, NSR data 130 corresponding to the point and direction. An NSR model 120 may output the NSR data 130 based on an input of the query input 110. The NSR model 120 may be a module designed and trained to output the NSR data 130 from the query input 110 and may include, for example, a neural network.

FIG. 1 shows two example query input points. The query input 110 may include coordinates representing a corresponding point in the 3D space and a view direction in the 3D space. The view direction may represent a direction (e.g., Ray 1 or Ray 2 of FIG. 1) passing through a pixel and/or points corresponding to the pixel from a viewpoint facing a two-dimensional (2D) scene (an image thereof) to be synthesized and/or reconstructed. In FIG. 1, as an example of the query input 110, coordinates of (x, y, z) and direction information of $(\theta, \phi)$ are illustrated. (x, y, z) are coordinates according to the Cartesian coordinate system based on a predetermined origin point, and $(\theta, \phi)$ are angles of the view direction relative to two predetermined reference axes (e.g., the positive direction of the z-axis and the positive direction of the x-axis).

The NSR data 130 may be data representing scenes of the 3D space viewed from several view directions and may include (i.e., a neural scene representation), for example, neural radiance field (NeRF) data. The NSR data 130 may include color information and volume densities 151 and 152 of the 3D space for each point and for each view direction of the 3D space. The color information may include color values according to a color space (e.g., a red value, a green value, and a blue value according to an RGB color space). The volume densities 151 and 152, σ, of a predetermined point/ray may be interpreted possibilities (e.g., differential probabilities) that a corresponding ray ends at infinitesimal particles of the corresponding point (e.g., from a ray march). In the graphs of the volume densities 151 and 152 shown in FIG. 1, the horizontal axis denotes distance along a ray from a viewpoint in a view direction, and the vertical axis denotes the value of the volume density as a function of the distance. A color value (e.g., an RGB value) may also be determined according to the ray distance in the view direction. However, the NSR data 130 is not limited to the above description, and may vary according to the design.

The NSR model 120 (e.g., a neural network) may learn the NSR data 130 corresponding to 3D scene information through deep learning. An image of a specific view specified by the query input 110 may be rendered by outputting the NSR data 130 from the NSR model 120 through the query input 110. The NSR model 120 may include a multi-layer perceptron (MLP)-based neural network. For the query input 110 of (x, y, z, θ, ϕ) specifying a point and direction of a ray, the neural network may be trained to output data (an RGB value, volume densities 151 and 152) of the corresponding point. For example, a view direction may be defined for each pixel of 2D scene images 191 and 192, and output values (e.g., the NSR data 130) of all sample points in the view direction may be calculated through a neural network operation. FIG. 1 shows the 2D scene image 191 of a vehicle object viewed from the front and the 2D scene image 192 of the vehicle object viewed from the side.

A large volume of training Images of various views for a 3D scene may be processed by the NSR model 120 to learn the 3D scene to provide renderings of a 2D scene from arbitrary respective views. Securing a large volume of training images through actual shooting may be difficult. According to an example, multiple augmentation training images of various new views may be derived from a few (sparse) original training images of base views through data augmentation based on image warping. The NSR model 120 may learn a 3D scene through the original training images and the augmented training images. A method of compensating for incompleteness of an augmented training image may be used for training based on the augmented training images.

Figure 2:
FIG. 2 illustrates an example rendering operation using a neural scene representation (NSR) model, according to one or more embodiments.
Figure 2:
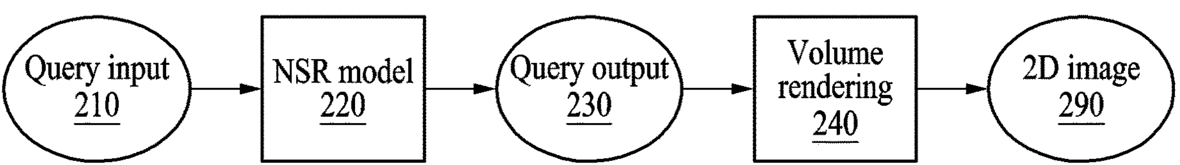

FIG. 2 illustrates an example of a rendering operation using an NSR model, according to one or more embodiments. A 2D image 290 may be generated from a query input 210 for a 3D space through an image generation operation 200. To generate the 2D image 290, view directions toward each pixel of the 2D image 290 from the viewpoint of the query input 210 may be defined. The viewpoint may be, for example, a position at which a virtual camera having a predetermined field of view (FOV) modeled as capturing a scene corresponding to the 2D image 290. For each pixel of the 2D image 290, the query input 210 includes (or specifies) a respectively corresponding view direction. Rays may be sampled along the respective directions; there may be sample points on each ray, and coordinates indicating each sample point on a ray may be generated.

Query outputs 230 for sample points on the ray in the view direction corresponding to one pixel of the 2D image 290 may be calculated, respectively. The query output 230 may include color information and a volume density (or transparency). Volume rendering 240 may be performed using query outputs calculated for the same pixel of the 2D image 290 (for each pixel of the 2D image). Volume rendering 240 may include an operation of accumulating color information and volume densities according to respective view directions. Based on query outputs of an NSR module 220 (for query inputs) of sample points of rays in view directions, pixel information corresponding to the view directions may be determined by accumulating color information and volume densities calculated for the sample points of the rays. Pixel values (e.g., color values of pixels) of pixels included in the 2D image 290 may be determined by performing volume rendering 240 for each pixel of the 2D image 290. The 2D image 290 may be generated by obtaining, in the way described above, pixel values for all pixels of the 2D image 290.

Figure 3:
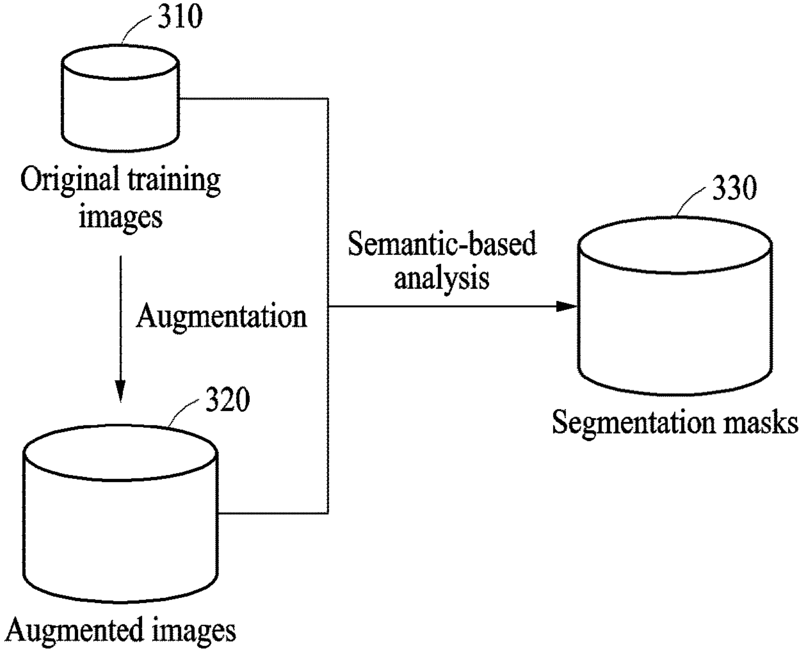
FIG. 3 illustrates an example process of forming training data, according to one or more embodiments.

FIG. 3 illustrates an example process of forming training data, according to one or more embodiments. Referring to FIG. 3, original training images 310 of respective base views of a target scene may be generated or obtained (a view may be a position and direction, e.g., a camera pose). The original training images 310 may be generated through actual shooting (a base view may be captured for each captured original training image). Augmented images 320 may be generated through augmentation of the original training images 310. Augmentation may include image warping. The image warping may be performed so that the augmented images 320 have respective new views that are different from the base views. Each of the original training images 310 and the augmented images 320 may have different respective views.

The number of original training images 310 may be limited to a predetermined number. The predetermined number may be a small number (e.g., within 10) that a person may easily capture. The number of augmented images 320 may be much greater than the number of original training images 310. The number of augmented images 320 may be a number (e.g., greater than or equal to 1000) that is inconvenient for a person to capture. For example, when a camera pose of a base view is rotated by 5 degree increments over a 30 degree range in the x-axis, y-axis, and z-axis directions, 2,196 augmented views may be determined. Through data augmentation, the augmented images 320 of various views may be sufficient for training the NSR model to learn the 3D scene represented in the original and augmented images.

Through a semantic-based analysis of the original training images 310 and the augmented images 320, segmentation masks 330 for separating foregrounds and backgrounds of the original training images 310 and the augmented images 320 may be generated. The segmentation masks 330 may correspond to saliency maps. The NSR model may segment foregrounds and backgrounds of the original training images 310 and the augmented images 320 based on the segmentation masks 330, which may be used to learn a 3D scene.

The semantic-based analysis may include semantic segmentation. As explained next, the suitability of the augmented images 320 as training data may improve based on the semantic analysis. During data augmentation, incomplete areas (e.g., “holes”) may be formed in the augmented images 320. Based on the semantic analysis, an incomplete area may be classified into a foreground or a background. Through such classification, the extent of incompleteness of incomplete areas may decrease. Such semantic-based analysis may improve the NSR model’s accuracy in learning the 3D scene.

Figure 4:
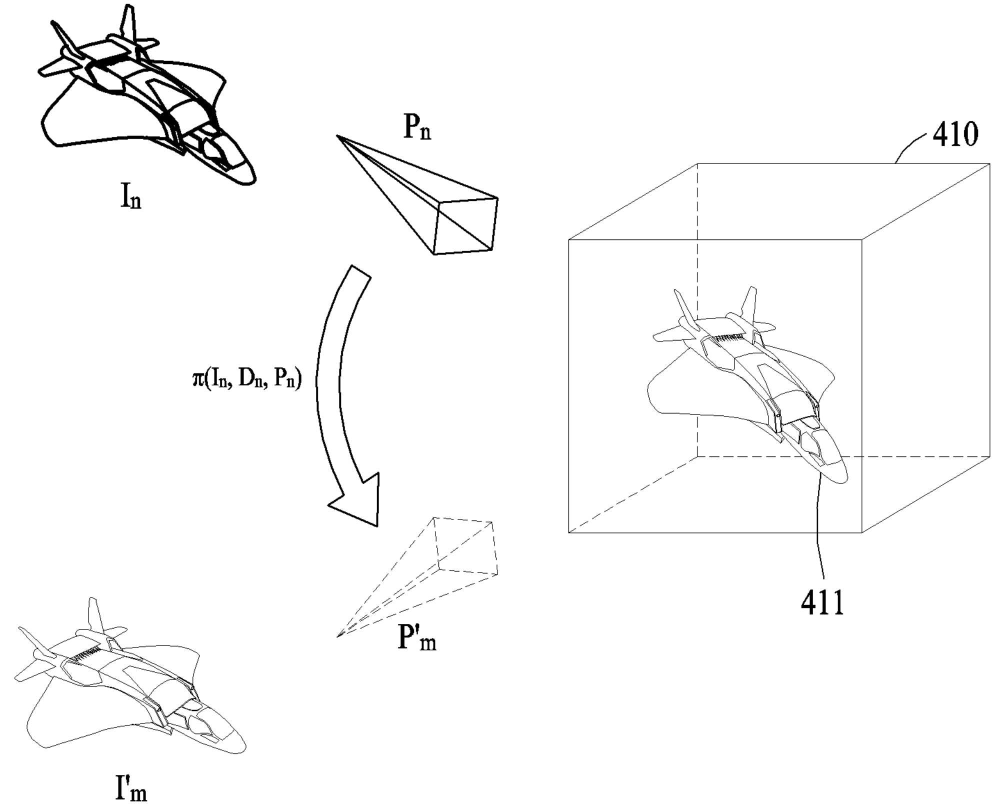
FIG. 4 illustrates an example process of generating an augmented image through image/view augmentation, according to one or more embodiments.

FIG. 4 illustrates an example process of generating an augmented image through image/view augmentation, according to one or more embodiments. Referring to FIG. 4, a 3D scene 411 in a 3D space 410 may be captured as a base camera pose $P_n$ and an original training image $I_n$ of the base camera pose $P_n$ may be generated. Variable n denotes the number of such original training images and corresponding base poses/views. Image warping may be performed on the original training image $I_n$ (as an example) based on an augmented camera pose $P'_m$, and an augmented image $I'_m$ (of an augmented view) may be generated based on the augmented camera pose $P'_m$. Variable m denotes the number of augmented images.

The example augmented image $I'_m$ may be generated according to image warping (e.g., forward-warping) based on an original data set $\pi$ and the augmented camera pose $P'_m$. Equation 1 shown below may be used for image warping.

$$p'=KT_{P\rightarrow P'}D(p)K^{-1}p \quad \text{Equation 1}$$

In Equation 1, K denotes a matrix of a camera intrinsic parameter (e.g., focal length, aperture, field-of-view, resolution, etc.) used to capture the original training image $I_n$, $T_{P\rightarrow P'}$ denotes a transformation function for transforming a base camera pose (P) into an augmented camera pose (P'), D denotes a depth map, p denotes a pixel value of the original training image $I_n$, and p' denotes a pixel value of the augmented image $I'_m$. $K^{-1}$ denotes an inverse matrix of K and D(p) denotes a depth of the pixel value p. An original depth map of the original training image $I_n$ may be determined through pixel values of the original training image $I_n$. Alternatively, the depth map may be obtained by various methods including the use of a depth camera, data obtained from a 3D model (e.g., a point cloud), etc. A warping result may be generated by warping the original training image $I_n$ to the augmented image $I'_m$ using the intrinsic parameter K, the original depth map, and the transformation function $T_{P\rightarrow P'}$.

According to an example, image augmentation may include additional image processing for an image warping result. For example, the additional image processing may include painting-in, i.e., coloring-in an occlusion area caused by warping. Through painting-in, a warping error caused by the image warping process may decrease. According to an example, image augmentation may include two augmentation operations. The first operation may involve image warping. The second operation may involve interpolation on a view between image warping results. For example, an augmented image of an intermediate view (a view between a first view and a second view) may be derived through interpolation on an image warping result of the first view (a first warped image) and an image warping result of the second view (a second warped image). In FIG. 4, $X'_m$ denotes an augmented data set of the augmented image $I'_m$ and the augmented camera pose $P'_m$ and X' denotes a set of augmented data sets $X'_m$.

Figure 5:
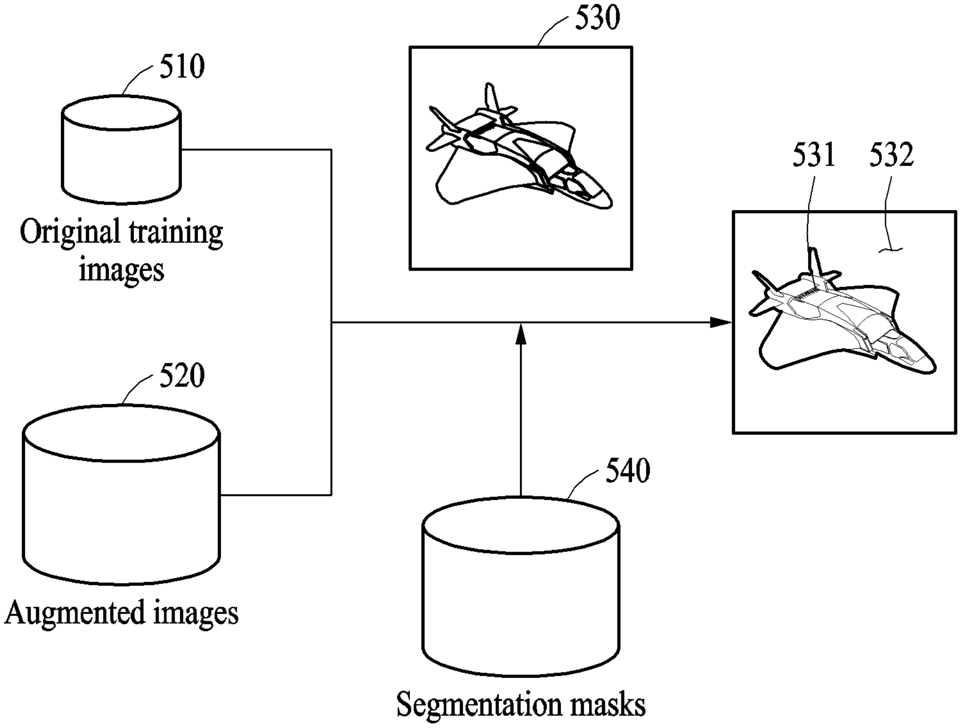
FIG. 5 illustrates an example process of segmenting original training images and augmented images into a foreground and background areas using segmentation masks, according to one or more embodiments.

FIG. 5 illustrates an example process of segmenting original training images and augmented images into foreground and background areas using segmentation masks, according to one or more embodiments. Referring to FIG. 5, a sample image 530 may be selected from original training images 510 and augmented images 520, and the sample image 530 may be divided/segmented into a foreground area 531 and a background area 532 based on segmentation masks 540. Each of the segmentation masks 540 may divide each of the respective original training images 510 and the augmented images 520 into foreground areas (e.g. foreground 531) and background areas (e.g., background 532). For example, a first segmentation mask may divide a first augmented image into a first foreground area and a first background area, a second segmentation mask may divide a second augmented image into a second foreground area and a second background area, and a third segmentation mask may divide a third original image into a third foreground area and a third background area.

The segmentation masks 540 may be determined by semantic segmentation of the original training images 510 and the augmented images 520. According to an example, a segmentation model implemented as a neural network may be used for the semantic segmentation. For example, the segmentation model may include a vision transformer (ViT). However, any method of foreground-background segmentation may be used.

The augmented images 520 may include warping errors due to the image warping. The segmentation masks 540 based on semantic segmentation may decrease effects of the warping errors. Rather than directly using the augmented images 520 to train an NSR model, dividing the augmented images 520 into foreground areas and background areas and using the foreground and background areas to train the NSR model may be helpful to improve the learning accuracy of the NSR model for a 3D scene.

More specifically, when the sample image 530 is selected and a first query output of an NSR model is determined based on a first query input indicating a first ray, it may be determined, using the segmentation masks 540 (e.g., the segmentation mask corresponding to the sample image 530) whether a target area to which the first ray is (or is in) the foreground area 531 of the sample image 530 or is (or is in) the background area 532 of the sample image 530. The foreground area 531 and the background area 532 of the sample image 530 may be divided by applying a segmentation mask corresponding to the sample image 530 among the segmentation masks 540. When the first ray indicates the foreground area 531 of the sample image 530, the foreground area 531 of the sample image 530 may be determined to be the target area. When the first ray indicates the background area 532 of the sample image 530, the background area 532 of the sample image 530 may be determined to be the target area.

The NSR model may be trained based on a pixel error between an actual pixel value of a first pixel of a target area specified by the first ray and an estimated pixel value based on the first query output. Pixel errors according to other rays of the sample image 530 and pixel errors according to other sample images of the original training images 510 and the augmented images 520 may be repeatedly calculated, and the NSR model may be repeatedly trained based on the pixel errors. Loss values of a loss function according to the pixel errors may be determined, and the NSR model may be trained (given more weight) in directions in which the loss values decrease.

Figure 6:
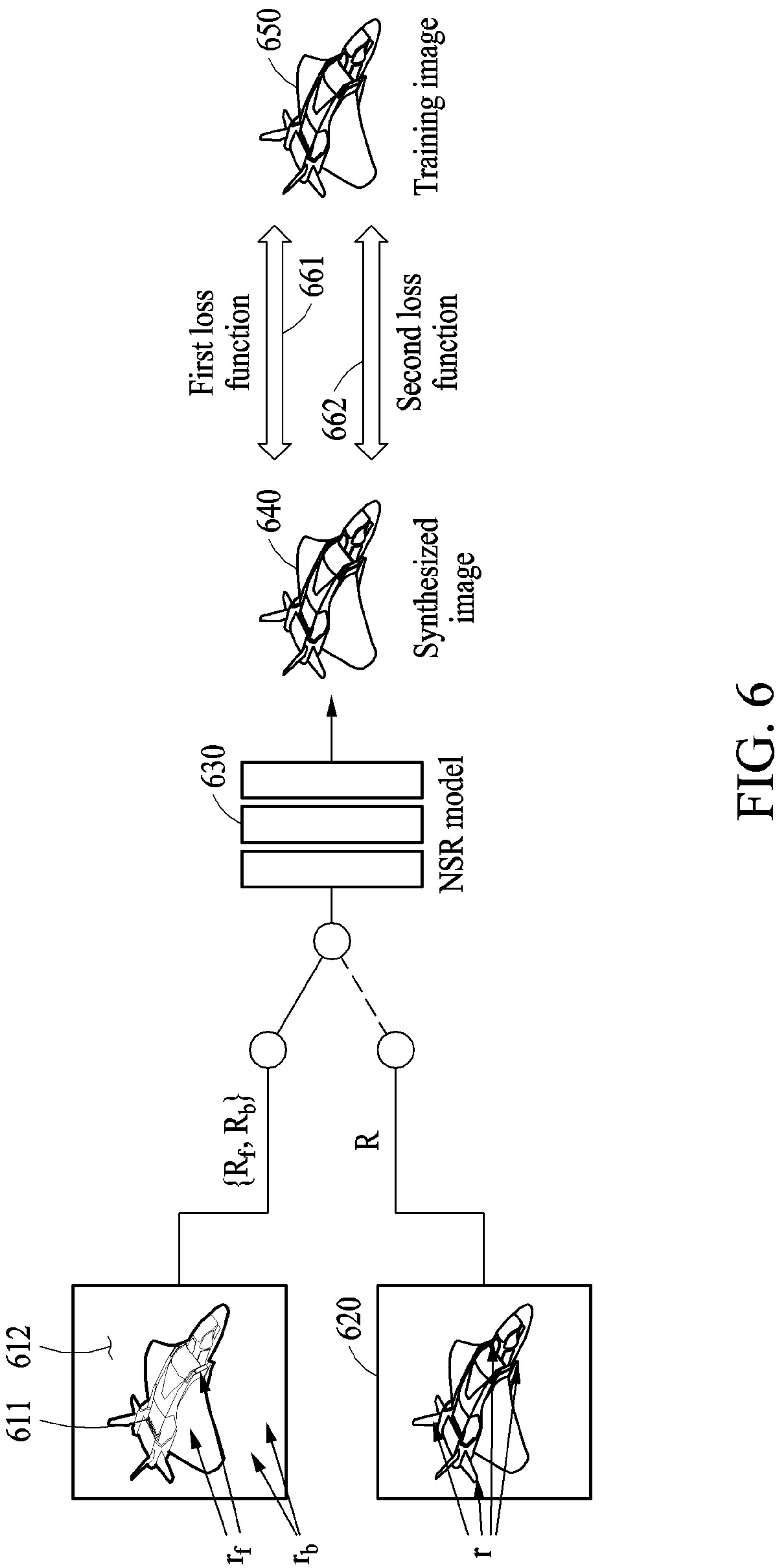
FIG. 6 illustrates an example process of training an NSR model using a training image, according to one or more embodiments.

FIG. 6 illustrates an example process of training an NSR model using a training image, according to one or more embodiments. Referring to FIG. 6, an NSR model 630 may be trained based on a foreground area image 611, a background area image 612, and an original training image 620 (which is not an augmented training image). The NSR model 630 may be trained in two steps, which are primary training and secondary training. The primary training may correspond to initialization of the NSR model 630 and the secondary training may correspond to fine-tuning of the NSR model 630. After the primary training is performed based on a predetermined iteration count (or any other stop condition), the secondary training may be performed.

A primary training data set for a primary training procedure may include original training images, augmented images, and segmentation masks. The foreground area image 611 and the background area image 612 may be determined by segmenting a sample image that is sampled from the original training images and the augmented images by segmentation masks. Thus, in some cases, the original training image 620 may differ from the foreground area image 611 and the background image area 612 (considered as a whole), since the foreground and background area images may come from an augmented training image rather than the original training image 620). The foreground area image 611 and the background area image 612 may be referred to as the primary training image. The primary training data set may further include camera poses corresponding to the primary training images, respectively.

For the primary training images, representative rays $r_f$ and $r_b$ and sample points on the rays $r_f$ and $r_b$ may be defined. The ray $r_f$ is defined for the foreground area image 611 and the ray $r_b$ is defined for the background area image 612. Ray sets $R_f$ and $R_b$ may include multiple rays and sample points on each ray, respectively. The rays of the ray set $R_f$ correspond to the representative ray $r_f$ and the rays of the ray set $R_b$ correspond to the representative ray $r_b$. Put another way, $R_f$ is the set of rays intersecting the foreground and $R_b$ is the set of rays intersecting the background. The NSR model 630 may output a synthesized image 640 based on query inputs according to the ray sets $R_f$ and $R_b$ For example, the NSR model 630 may output the synthesized image 640 corresponding to an estimated version of the foreground area image 611 based on query inputs according to the ray set $R_f$ of the foreground area image 611, and may output the synthesized image 640 according to the ray set $R_b$ of the background area image 612.

The primary training of the NSR model may be performed using the original training images, augmented images, segmentation masks, and a first loss function. In the primary training procedure, the NSR model 630 may be trained based on a first loss function 661. The first loss function 661 may be defined based on a pixel error between the synthesized image 640 and a training image 650. In the primary training, the training image 650 may correspond to a sample image including the foreground area image 611 and the background area image 612. The pixel error may be determined through only some pixels rather than the entire image (discussed below). The first loss function 661 may determine losses based on a pixel error between an actual pixel value of the foreground area image 611 and the background area image 612 and corresponding pixel values estimated by the NSR model 630. In the primary training procedure using this pixel error, the NSR model 630 may be trained based on a pixel error of some pixels of the synthesized image 640. In this case, the some pixels and rays $r_f$ and $r_b$ to the pixels may be arbitrarily (e.g., randomly) determined.

The first loss function 661 may be implemented with hardware and/or instructions configured as expressed by Equations 2 and 3 below. A loss according to the ray $r_f$ of the foreground area image 611 may be calculated through Equation 2 and a loss according to the ray $r_b$ of the background area image 612 may be calculated through Equation 3.

Conceptually, the first loss function is for loss of pixel values predicted by the NSR model compared to pixels of a ground truth image. Each of Equations 2 and 3 has (i) a first term corresponding to loss of pixel value predicted by a fine sub model of the NSR model and (ii) a second term corresponding to loss of pixel value predicted by a coarse sub model of the NSR model. The first loss function may be divided into a foreground part (Equation 2) and a background part (Equation 3). Equation 2 is based on differences between predicted pixel values of foreground area image 611 and corresponding foreground pixel values of the ground truth image 650, and Equation 3 is based on differences between predicted pixel values of background image area 612 and ground truth image 650. To summarize the first loss function may have Equation 2 for foreground loss and Equation 3 for background loss.

$$\mathcal{L}_{MSE}(\theta, R_f) = \sum_{r \in R_f} \left[ \|\widehat{C_c}(r) - C(r)\|_2^2 + \|\hat{C}_f(r) - C(r)\|_2^2 \right] \quad \text{Equation 2}$$

$$\mathcal{L}_{MSE}(\theta, R_b) = \sum_{r \in R_b} \left[ \|\widehat{C_c}(r) - BG\|_2^2 + \|\hat{C}_f(r) - BG\|_2^2 \right] \quad \text{Equation 3}$$

In Equations 2 and 3, subscript "c" means "coarse" (a coarse sub-model of the NSR model 630 is discussed below), and subscript "f" means "fine" (a fine sub-model of the NSR model 630 is also discussed below). In Equations 2 and 3, $L_{MSE}$ denotes the first loss function 661, θ denotes the NSR model 630, $\widehat{C_c}$ (r) denotes a pixel value estimated by executing a first (coarse) sub model of the NSR model 630 through r, and $\widehat{C_f}$ (r) denotes a pixel value estimated by executing a second (fine) sub model of the NSR model 630 through r.

In Equation 2, $R_f$ denotes the ray set of the foreground area image 611, C(r) denotes a pixel value of the training image 650 according to r. The rat r of Equation 2 may correspond to the ray $r_f$.

In Equation 3, $R_b$ denotes the ray set of the background area image 612, BG (e.g., $C_f(r)$) denotes a pixel value of the background area image 612 according to r, and $\widehat{C_f}$ (r) denotes a pixel value estimated by executing a second sub model of the NSR model 630 through r. When a color of the background area is fixed, BG may have a predetermined value and when colors of the background are various, BG may have various values. Equation 3 may assume that the color of the background area is fixed. In this case, BG may have a value of 0 or 255. When the colors of the background area are various, BG may be determined to be a pixel value of the training image 650 as Equation 2. Rat r of Equation 3 may correspond to the ray $r_b$.

As noted, according to an example, the NSR model 630 may be modeled as including a first sub model and a second sub model. The first sub model may be a coarse network and the second sub model may be a fine network. The first sub model may use uniformly distributed sample points. The second sub model may use sample points having high densities in a high density area (e.g., where there is a higher sample rate, higher rate of change of a feature, etc.). The second sub model may use more sample points than the first sub model.

Equations 2, 3, and 4 (below) may assume that the NSR model 630 includes a first sub model and a second sub model as mentioned. However, unlike Equations 2, 3, and 4, the NSR model 630, as implemented, may be only a single model (or a de facto single model for purposes of NSR modeling). In this case, noting that Equations 2, 3, and 4 have two pixel error terms (for respective sub-models), the first loss function 661 may be computed by computing one of the pixel error terms according to the NSR model and the other of the pixel error terms according to the foreground or background area, as the case may be. For example, the first pixel value (for the first pixel error term) according to the first ray may be estimated using the NSR model, the second pixel value (for the second pixel error term) according to the first ray may be extracted from either the foreground area image 611 or the background area image 612 corresponding to the first ray, and the loss value of the first loss function may be determined based on the pixel error between the first pixel value and the second pixel value. When the first ray indicates the foreground area, the second pixel value may be extracted from the foreground area image 611, and when the first ray indicates the background area, the second pixel value may be extracted from the background area image 612.

A secondary training data set for a secondary training procedure may include original training images, such as the original training image 620. The secondary training of the NSR model may be performed using the original training images and a second loss function. The original training image 620 may be referred to as a secondary training image. The secondary training data set may further include camera poses corresponding to the secondary training images, respectively. For the secondary training images, a ray r and sample points on the ray r may be defined. A ray set R may include a plurality of rays and sample points on each ray. The plurality of rays of the ray set R may correspond to the ray r.

The NSR model 630 may output a synthesized image 640 based on query inputs according to the ray set R. For example, the NSR model 630 may output the synthesized image 640 corresponding to an estimated version of the original training image 620 based on query inputs according to the ray set R of the original training image 620. In the secondary training procedure, the NSR model 630 may be trained based on the original training image 620 and the second loss function. The second loss function may be defined based on a pixel error between the original training image 620 and the synthesized image 640 estimated by the NSR model 630, semantic consistency between the original training image 620 and the synthesized image 640, and uncertainty of transmittance based on the ray.

A sub loss function for a pixel error of the second loss function may be defined by Equation 4.

$$\mathcal{L}_{MSE}(\theta, R) = \sum_{r \in R}\left[\|\hat{C}_c(r) - C(r)\|_2^2 + \left\|\hat{C}_f(r) - C(r)\right\|_2^2\right] \quad \text{Equation 4}$$

In Equation 4, $L_{MSE}$ denotes the second loss function, θ denotes the NSR model 630, R denotes the ray set of the original training image 620, $\hat{C}_c$(r) denotes a pixel value estimated by executing the first sub model of the NSR model 630 through r, C(r), denotes a pixel value of the training image 650 according to r, and $\hat{C}_f$(r) denotes a pixel value estimated by executing the second sub model of the NSR model 630 through r. r of Equation 4 may correspond to the ray r. In the secondary training, the training image 650 may correspond to the original training image 620.

The semantic consistency of the second loss function and the uncertainty of transmittance according to the ray may be determined based on a sub loss function for a multi-level semantic error and/or a sub loss function for information potential. The sub loss functions of the second loss function are described with reference to FIGS. 7 and 8. The pixel error may be determined through some pixels rather than the entire image. Unlike the pixel error, the entire image may be required to accurately evaluate semantic consistency. A loss value through the second loss function may be calculated after completely deriving the synthesized image 640 from the secondary training procedure.

Figure 7:
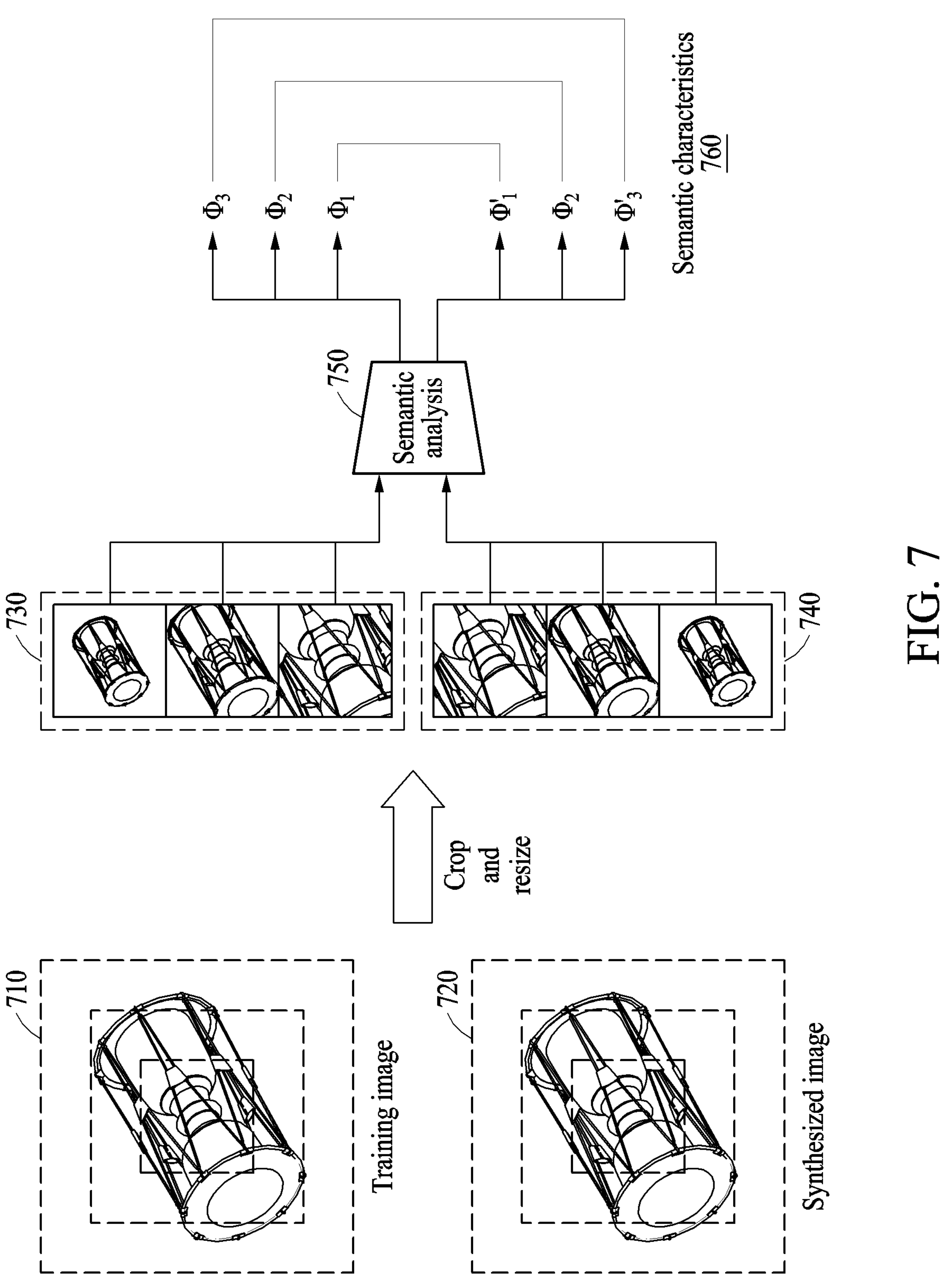
FIG. 7 illustrates an example process of deriving a loss value based on a semantic characteristic, according to one or more embodiments.

FIG. 7 illustrates an example process of deriving a loss value based on a semantic characteristic, according to one or more embodiments. Referring to FIG. 7, first multi-level patches 730 may be generated by cropping and resizing a training image 710 and second multi-level patches 740 may be generated by cropping and resizing a synthesized image 720. The training image 710 may correspond to an original training image (e.g. not an augmented training image). The synthesized image 720 may be estimated by executing an NSR model through a ray set of the original training image.

Through a semantic analysis 750 of the first multi-level patches 730 and the second multi-level patches 740, semantic characteristics 760 of the first multi-level patches 730 and the second multi-level patches 740 may be generated. According to an example, an analysis model based on a neural network may be used for the semantic analysis 750. For example, a segmentation model may include a ViT. The semantic characteristics 760 may include first semantic characteristics ($\varphi_1$, $\varphi_2$, and $\varphi_3$ of the first multi-level patches 730 and second semantic characteristics ($\varphi_1'$, $\varphi_2'$, and $\varphi_3'$ of the second multi-level patches 740.

A multi-level semantic error may be determined based on a difference between the first semantic characteristics $\varphi_1$, $\varphi_2$, and $\varphi_3$ and the second semantic characteristics $\varphi_1'$, $\varphi_2'$, and $\varphi_3'$. The multi-level semantic error may represent semantic consistency between the training image 710 and the synthesized image 720. Equation 5 may be used to determine the multi-level semantic error.

$$\mathcal{L}_{MSC} = \sum_{l=1}^{L} S(\phi_l(\hat{I}), \phi_l(I)) \quad \text{Equation 5}$$

In Equation 5, $L_{MSC}$ denotes a sub loss function for a multi-level semantic error, L denotes the total number of levels, S denotes similarity (e.g., cosine similarity), Î denotes the synthesized image 720, I denotes the training image 710, and $\varphi_l$ denotes a semantic characteristic of a patch of an l-th level (e.g., a zoom/magnification level).

Figure 8:
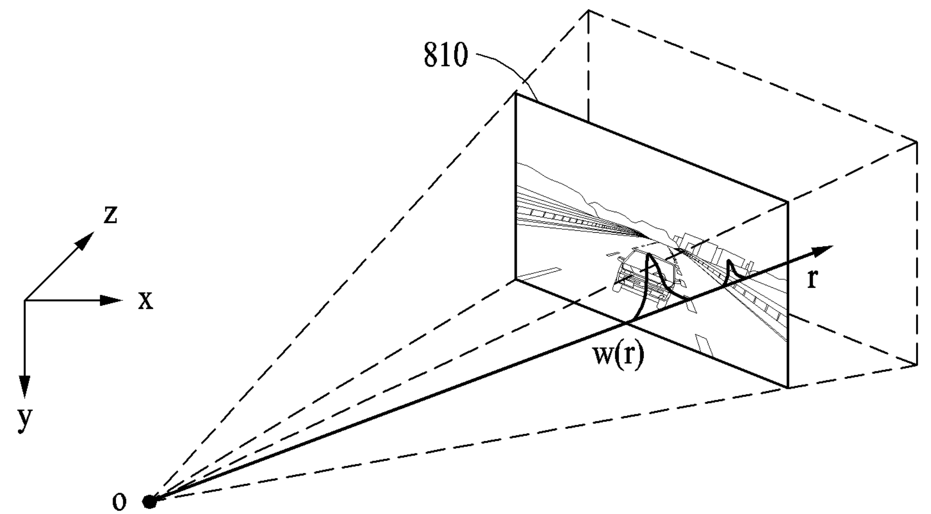
FIG. 8 illustrates an example of deriving a loss value based on an information potential, according to one or more embodiments.

FIG. 8 illustrates an example of deriving a loss value based on an information potential, according to one or more embodiments. According to an example, uncertainty of transmittance based on a ray may be restrained by regularization using information potential (IP). The product of the transmittance of a sample point and a volume density may be deemed as one weight. Weights of sample points may be determined by products of transmittances and volume densities of sample points of rays of an original training image, and a loss value of a sub loss function of the second loss function may be determined based on the uncertainty of the transmittance based (on the ray based) on the weights of the rays.

As illustrated in FIG. 8, a distribution of weights (see w(r)) may tend to concentrate on a surface of a scene 810. As a probability density function sharpens, Shannon entropy may decrease. By considering this, entropy of a weight distribution may be minimized when the NSR model is optimized to the scene 810. Based on the characteristic, IP derived from Renyi quadratic entropy may be used. Renyi quadratic entropy may be more suitable for gradient-based optimization compared to Shannon entropy. The IP for the weight may be expressed by discarding a negative logarithm from Renyi quadratic entropy as in Equation 6.

$$\mathcal{L}_{IP} = -\frac{1}{|\mathcal{R}|}\sum_{r \in R}\sum_{i=1}^{N}\bar{w}_i(r)^2 \quad \text{Equation 6}$$

In Equation 6, $L_{IP}$ denotes a sub loss function for IP and R denotes a ray set. $\overline{w}_i(r)$ of Equation 6 may be expressed as Equation 7 and $w_i$ (r) of Equation 7 may be expressed as Equation 8.

$$\bar{w}_i(r) = w_i(r) / \sum_{j=1}^{N} w_j(r) \quad \text{Equation 7}$$

$$w_i(r) = T_i(1 - \exp(-\sigma_i \delta_i)) \quad \text{Equation 8}$$

In Equations 7 and 8, $w_i(r)$ denotes a weight of an i-th sample point of a ray r. $T_i$ denotes accumulated transmittance according to the ray r from the i-th sample point, $\sigma_i$ denotes a volume density of an i-th sample point, and $\delta_i$ denotes a distance between the i-th sample point and an i+1-th sample point. When a weight distribution concentrates on a predetermined bin, the IP may increase, and thus, the training procedure may be performed to maximize a value of $L_{IP}$ by multiplying −1 by the $L_{IP}$.

Figure 9:
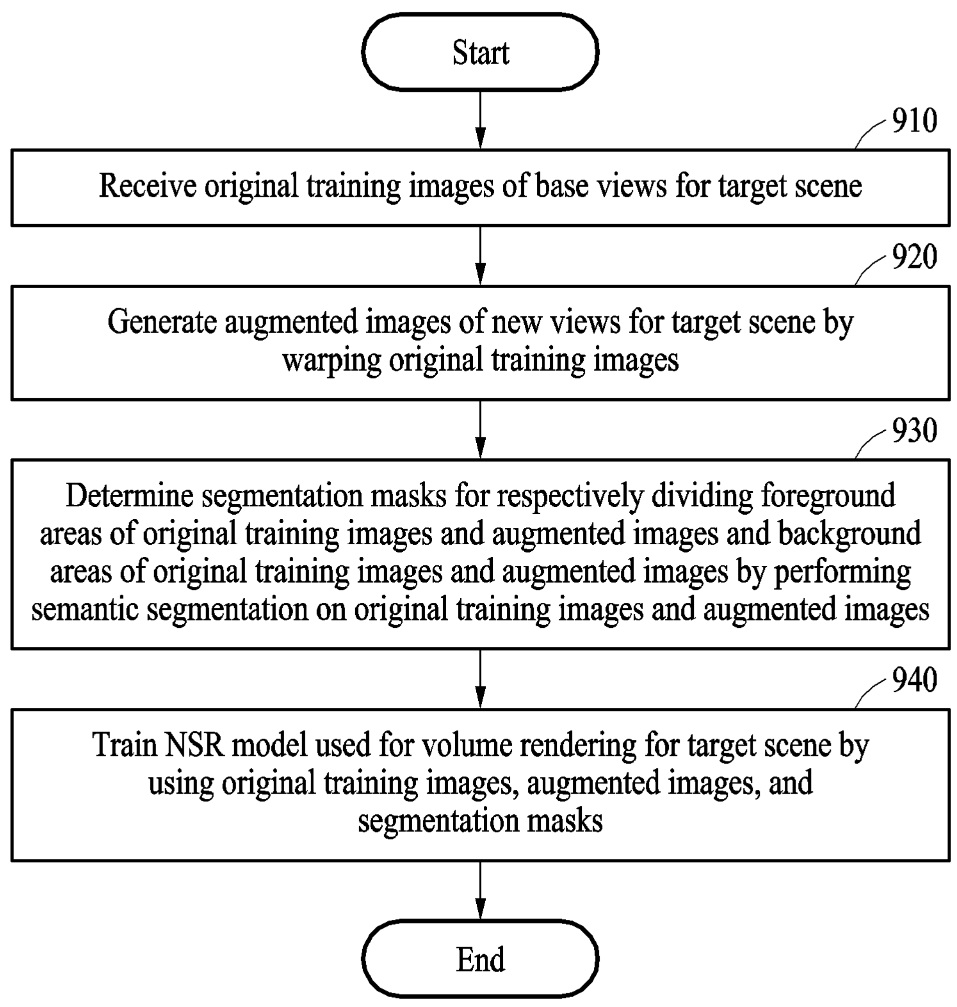
FIG. 9 illustrates an example method of training an NSR model, according to one or more embodiments.

FIG. 9 illustrates an example method of training an NSR model, according to one or more embodiments. Referring to FIG. 9, in operation 910 a training apparatus may receive original training images of base views for a target scene. In operation 920, the training apparatus may generate augmented images of new views for the target scene by warping the original training images. In operation 930, the training apparatus may determine segmentation masks for respectively dividing foreground areas of the original training images and the augmented images and background areas of the original training images and the augmented images by performing semantic segmentation on the original training images and the augmented images. In operation 940, an NSR model may be trained to be used for volume rendering for the target scene by using the original training images (and their camera poses), the augmented images (and their augmented-image camera poses (augmented poses)), and the segmentation masks.

Operation 920 may include an operation of determining a transformation function for transforming a camera pose of a first base view of a first original training image of the original training images into a camera pose of a first new view of a corresponding first augmented image of the augmented images and an operation of generating the first augmented image by warping the first original training image using a camera intrinsic parameter of the first original training image, an original depth map corresponding to the first original training image, and the transformation function.

Operation 940 may include an operation of performing primary training of the NSR model using the original training images, the augmented images, the segmentation masks, and a first loss function. Operation 940 may also include an operation of performing secondary training of the NSR model using the original training images and a second loss function.

The first loss function may be defined based on a pixel error between an actual pixel value of the training images (the original training image and the augmented image) and a pixel value estimated by the NSR model. The second loss function may be defined based on a pixel error between the original training images and a synthesized image estimated by the NSR model, semantic consistency between the original training images and the synthesized image, and uncertainty of transmittance based on a ray.

The operation of performing the primary training may include selecting a first sample image from the original training images and the augmented images, determining a first query output of the NSR model according to a first query input indicating a first ray, determining a target area to which the first ray intersects among a foreground area of the first sample image and a background area of the first sample image, based on the segmentation masks, and determining a loss value of the first loss function based on an actual pixel value of a first pixel of the target area specified by the first ray and an estimated pixel value according to the first query output.

The operation of determining the target area may include dividing the foreground area of the first sample image and the background area of the first sample image by applying a first segmentation mask corresponding to the first sample image among the segmentation masks to the first sample image, when the first ray indicates the foreground area of the first sample image, determining the foreground area of the first sample image to be the target area, and when the first ray indicates the background area of the first sample image, determining the background area of the first sample image to be the target area.

The operation of performing the secondary training may include generating a first synthesized image according to a first ray set of a first original training image among the original training images by using the NSR model, estimating first semantic characteristics of multi-level patches of the first original training image and second semantic characteristics of multi-level patches of the first synthesized image, determining semantic consistency between the first original training image and the first synthesized image based on a difference between the first semantic characteristics and the second semantic characteristics, and determining a loss value of the second loss function based on the determined semantic consistency.

The operation of performing the secondary training may include, based on products of volume densities and transmittances of sample points of rays of a first original training image among the original training images, determining weights of the sample points and determining a loss value of the second loss function based on the weights of the rays.

The number of original training images may be limited to a predetermined number.

In addition, the description provided with reference to FIGS. 1 to 8, 10, and 11 may generally apply to the training method of FIG. 9.

Figure 10:
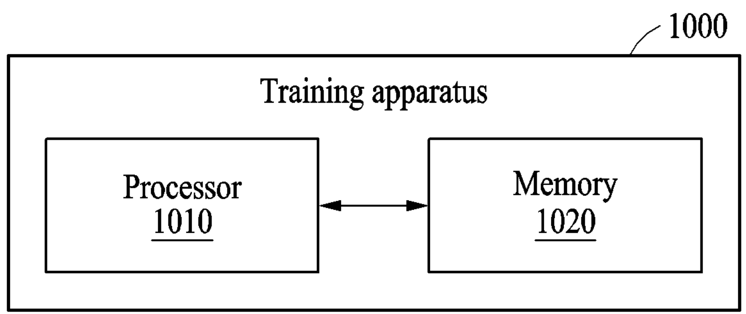
FIG. 10 illustrates an example configuration of a training apparatus, according to one or more embodiments.

FIG. 10 illustrates an example configuration of a training apparatus, according to one or more embodiments. Referring to FIG. 10, a training apparatus 1000 may include a processor 1010 and a memory 1020. The memory 1020 may be connected to the processor 1010 and store instructions executable by the processor 1010, data to be calculated by the processor 1010, or data processed by the processor 1010. The memory 1020 includes a non-transitory computer readable medium, for example, high-speed random access memory, and/or a non-volatile computer readable storage medium, for example, at least one disk storage device, a flash memory device, or other non-volatile solid state memory devices.

The processor 1010 may execute the instructions to perform operations of FIGS. 1 to 9 and 11. For example, the processor 1010 may be configured to receive original training images of base views for a target scene, generate augmented images of new views for the target scene by warping the original training images, determine segmentation masks for respectively dividing foreground areas of the original training images and the augmented images and background areas of the original training images and the augmented images by performing semantic segmentation on the original training images and the augmented images, and train an NSR model used for volume rendering for the target scene by using the original training images, the augmented images, and the segmentation masks. In addition, the description provided with reference to FIGS. 1 to 9 and FIG. 11 may generally apply to the training apparatus 1000.

Figure 11:
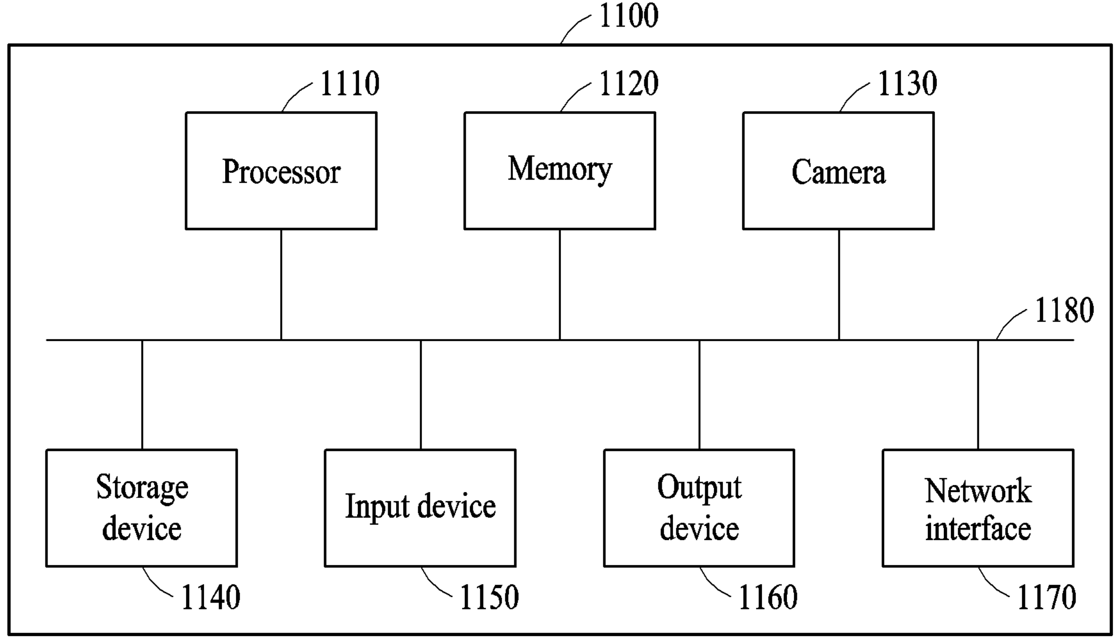
FIG. 11 illustrates an example configuration of an electronic device, according to one or more embodiments.

FIG. 11 illustrates an example configuration of an electronic device, according to one or more embodiments. Referring to FIG. 11, an electronic device 1100 may include a processor 1110, a memory 1120, a camera 1130, a storage device 1140, an input device 1150, an output device 1160, and a network interface 1170 that may communicate with each other through a communication bus 1180. For example, the electronic device 1100 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as an autonomous vehicle or a smart vehicle. The electronic device 1100 may include, structurally and/or functionally, the training apparatus 1000 of FIG. 10.

The processor 1110 may execute functions and instructions to be executed in the electronic device 1100. For example, the processor 1110 may process the instructions stored in the memory 1120 or the storage device 1140. The processor 1110 may perform one or more, or all, of the operations or methods described above with reference to FIGS. 1 to 10. The memory 1120 may include a computer-readable storage medium or a computer-readable storage device. The memory 1120 may store instructions to be executed by the processor 1110 and may store related information while software and/or an application is executed by the electronic device 1100.

The camera 1130 may capture a photo and/or a video. The camera 1130 may generate original training images of base views for a target scene. The storage device 1140 includes a computer-readable storage medium or computer-readable storage device. The storage device 1140 may store a more quantity of information than the memory 1120 for a long time. For example, the storage device 1140 may include a magnetic hard disk, an optical disc, a flash memory, a floppy disk, or other non-volatile memories known in the art.

The input device 1150 may receive an input from the user in traditional input manners through a keyboard and a mouse, and in new input manners such as a touch input, a voice input, and an image input. For example, the input device 1150 may include a keyboard, a mouse, a touch screen, a microphone, or any other device that detects the input from the user and transmits the detected input to the electronic device 1100. The output device 1160 may provide an output of the electronic device 1100 to the user through a visual, auditory, or haptic channel. The output device 1160 may include, for example, a display, a touch screen, a speaker, a vibration generator, or any other device that provides the output to the user. The network interface 1170 may communicate with an external device through a wired or wireless network.

The computing apparatuses, the vehicles, the electronic devices, the processors, the memories, the image sensors/cameras, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of training a neural scene representation (NSR) model, the method comprising:

receiving original training images of a target scene, the original training images respectively corresponding to base views of the target scene;

generating augmented images of the target scene by warping the original training images, the augmented images respectively corresponding to new views of the target scene, wherein the generating the augmented images comprises:

determining a transformation function for transforming a camera pose of a first of the base views of a first of the original training images into a camera pose of a first of the new views of a first of the augmented images; and generating a first augmented image by warping a first original training image using an intrinsic camera parameter of the first original training image, an original depth map corresponding to the first original training image, and the transformation function;

performing background-foreground segmentation on the original training images and the augmented images to generate segmentation masks; and training the NSR model to be configured for volume rendering of the target scene by using the original training images, the augmented images, and the segmentation masks, wherein the training of the NSR model comprises:

performing primary training of the NSR model using the original training images, the augmented images, the segmentation masks, and a first loss function; and performing secondary training of the NSR model using the original training images and a second loss function, wherein the first loss function is based on a pixel error between (i) an actual pixel value from the original training images and the augmented images and (ii) a pixel value estimated by the NSR model, and wherein the second loss function is based on a pixel error between the original training images and a synthesized image estimated by the NSR model, semantic consistency between the original training images and the synthesized image, and uncertainty of transmittance based on a ray.

2. The method of claim 1, wherein the performing of the primary training comprises:

selecting a first sample image from the original training images and the augmented images;

determining a first query output of the NSR model according to a first query input defining a first ray;

determining a target area to which the first ray belongs from among a foreground area of the first sample image and a background area of the first sample image, based on the segmentation masks; and determining a loss value of the first loss function based on an actual pixel value of a first pixel of the target area specified by the first ray and an estimated pixel value according to the first query input.

3. The method of claim 2, wherein the determining of the target area comprises:

dividing the foreground area of the first sample image and the background area of the first sample image by applying a first of the segmentation masks corresponding to the first sample image to the first sample image;

when the first ray indicates the foreground area of the first sample image, determining the foreground area of the first sample image to be the target area; and when the first ray indicates the background area of the first sample image, determining the background area of the first sample image to be the target area.

4. The method of claim 1, wherein the performing of the secondary training comprises:

generating a first synthesized image according to a first ray set of a first of the original training images by using the NSR model;

estimating first semantic characteristics of patches of the first original training image and second semantic characteristics of patches of the first synthesized image;

determining semantic consistency between the first original training image and the first synthesized image based on a difference between the first semantic characteristics and the second semantic characteristics; and determining a loss value of the second loss function based on the determined semantic consistency.

5. The method of claim 1, wherein the performing of the secondary training comprises:

based on products of volume densities and transmittances of sample points of rays of the first original training image among the original training images, determining weights of the sample points; and determining a loss value of the second loss function based on the weights of the rays.

6. The method of claim 1, wherein a number of original training images is limited to a predetermined number.

7. An apparatus comprising:

one or more processors; and a memory storing instructions configured to cause the one or more processors to:

receive original training images of a target scene, the original training images respectively corresponding to base views of the target scene, generate augmented images of the target scene by warping the original training images, the augmented images respectively corresponding to new views of the target scene, determine foreground-background segmentation masks of the original training images and the augmented images by performing foreground-background segmentation on the original training images and the augmented images, and train a neural scene representation (NSR) model to be configured for volume rendering of the target scene by using the original training images, the augmented images, and the foreground-background segmentation masks, wherein, to generate the augmented images, the instructions stored in the memory are further configured to cause the one or more processors to:

determine a transformation function for transforming a base camera pose of a first original training image of the original training images into a new camera pose of a first augmented image of the augmented images, and generate the first augmented image by warping the first original training image using a camera intrinsic parameter of the first original training image, an original depth map corresponding to the first original training image, and the transformation function, wherein, to train the NSR model, the instructions are further configured to cause the one or more processors to:

perform primary training of the NSR model using the original training images, the augmented images, the foreground-background segmentation masks, and a first loss function, and perform secondary training of the NSR model using the original training images and a second loss function, wherein the first loss function is based on a pixel error between an actual pixel value of the original training images and the augmented images and a pixel value estimated by the NSR model, and wherein the second loss function is based on a pixel error between the original training images and a synthesized image estimated by the NSR model, semantic consistency between the original training images and the synthesized image, and uncertainty of transmittance based on a ray.

8. The apparatus of claim 7, wherein the original training images are respectively associated with base camera poses, the augmented images are respectively associated with new camera poses, and wherein the training of the NSR model also uses the base camera poses and the new camera poses.

9. The apparatus of claim 7, wherein, to perform the primary training, the instructions are further configured to cause the one or more processors to:

select a first sample image from the original training images and the augmented images, determine a first query output of the NSR model according to a first query input indicating a first ray, determine a target area to which the first ray belongs among a foreground area of the first sample image and a background area of the first sample image, based on the foreground-background segmentation masks, and determine a loss value of the first loss function based on an actual pixel value of a first pixel of the target area specified by the first ray and an estimated pixel value according to the first query output.

10. The apparatus of claim 9, wherein, to determine the target area, the instructions are further configured to cause the one or more processors to:

divide the foreground area of the first sample image and the background area of the first sample image by applying a first of the foreground-background segmentation masks corresponding to the first sample image to the first sample image, when the first ray indicates the foreground area of the first sample image, determine the foreground area of the first sample image to be the target area, and when the first ray indicates the background area of the first sample image, determine the background area of the first sample image to be the target area.

11. The apparatus of claim 7, wherein, to perform the secondary training, the instructions are further configured to cause the one or more processors to:

generate a first synthesized image according to a first ray set of a first of the original training images by using the NSR model, estimate first semantic characteristics of multi-level patches of the first original training image and second semantic characteristics of multi-level patches of the first synthesized image, determine semantic consistency between the first original training image and the first synthesized image based on a difference between the first semantic characteristics and the second semantic characteristics, and determine a loss value of the second loss function based on the determined semantic consistency.

12. An electronic device comprising:

a camera generating original training images of respective original camera poses of a target scene, the original training images respectively corresponding to base views of the target scene; and one or more processors;

a memory storing instructions configured to cause the one or more processors to:

generate augmented images of respective augmentation-image camera poses for the target scene by warping the original training images, the augmented images respectively corresponding to new views of the target scene, determine segmentation masks for dividing areas of the original training images and the augmented images by performing segmentation on the original training images and the augmented images, and train a neural scene representation (NSR) model used for volume rendering for the target scene by using the original training images and their respective original camera poses, the augmented images and their respective augmentation-image camera poses, and the segmentation masks, wherein, to generate the augmented images, the instructions are further configured to cause the one or more processors to:

determine a transformation function for transform a first original camera pose of a first of the original training images into a first of the augmentation-image camera poses of a first of the augmented images, and generate the first of the augmented images by warping a first original training image using a camera intrinsic parameter of the first of the original training images, an original depth map corresponding to the first of the original training images, and the transformation function, wherein, to train the NSR model, the instructions are further configured to cause the one or more processors to:

perform primary training of the NSR model using the original training images, the augmented images, the segmentation masks, and a first loss function, and perform secondary training of the NSR model using the original training images and a second loss function, wherein the first loss function is based on a pixel error between an actual pixel value of the original training images and the augmented images and a pixel value estimated by the NSR model, and wherein the second loss function is based on a pixel error between the original training images and a synthesized image estimated by the NSR model, semantic consistency between the original training images and the synthesized image, and uncertainty of transmittance based on a ray.

* * * * *